Aug. 11, 1942.                E. L. BARKER                2,293,012
                     WELL CASING HEAD CONSTRUCTION
                       Filed April 9, 1941      2 Sheets-Sheet 2
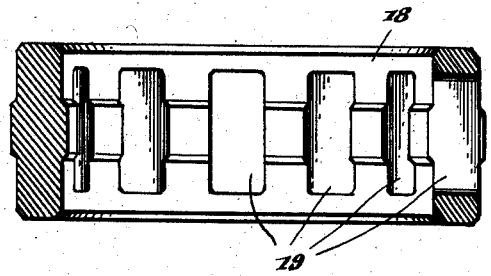
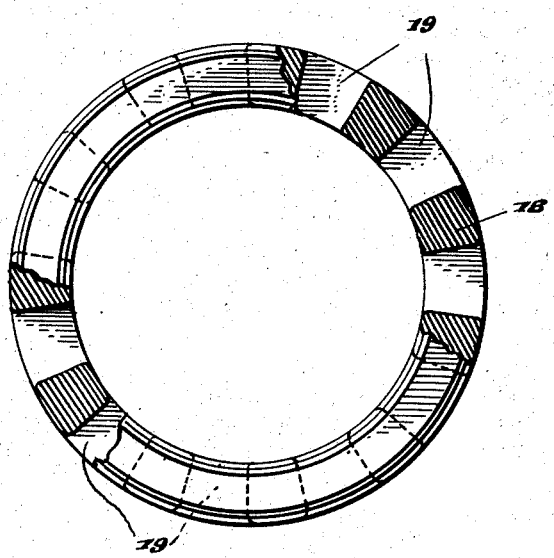
Inventor
ERNEST L. BARKER Patented Aug. 11, 1942

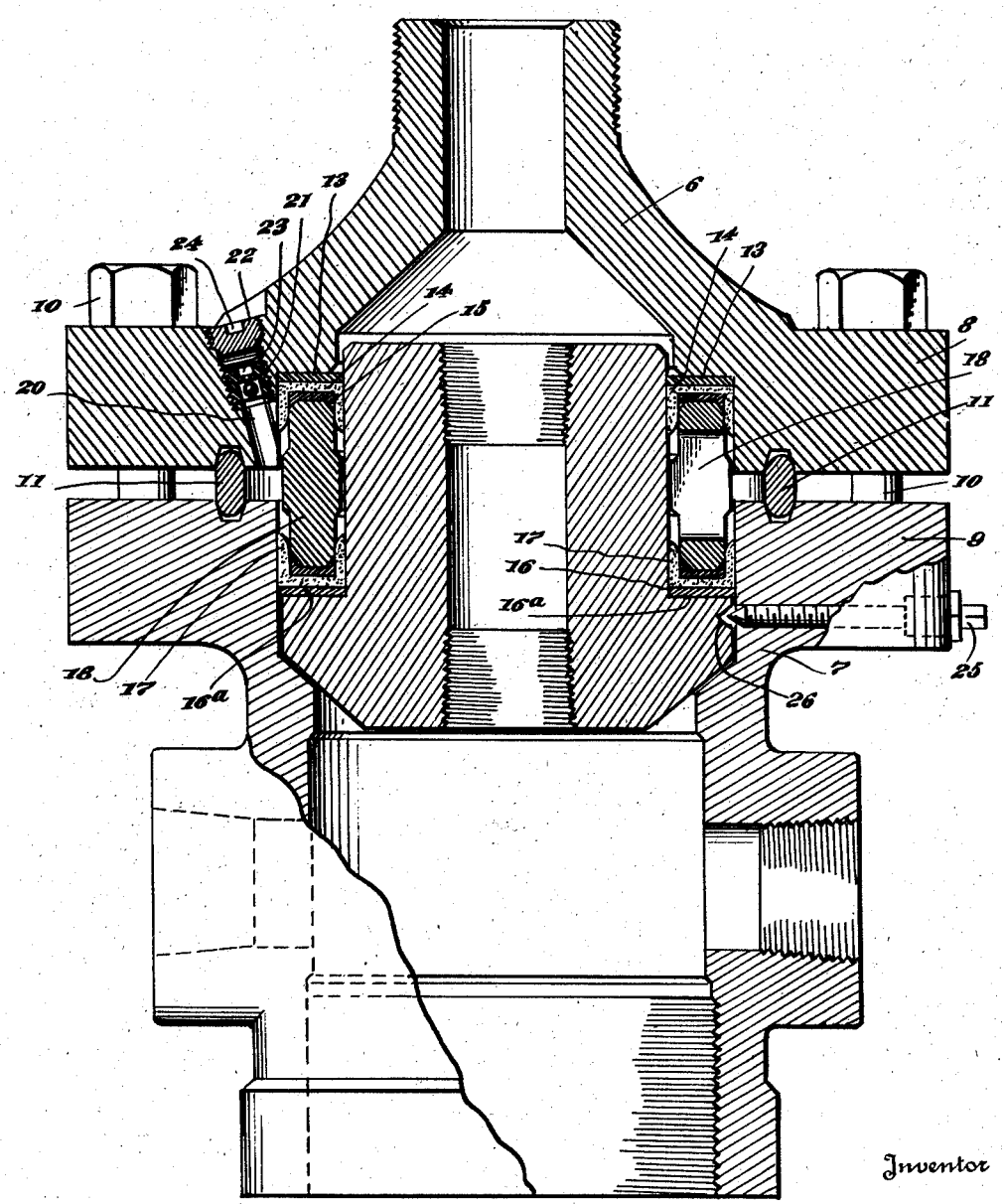

2,293,012

UNITED STATES PATENT OFFICE 2,293,012

WELL CASING HEAD CONSTRUCTION

Ernest L. Barker, Houston, Tex., assignor to Abylene Garrison Barker, Houston, Tex.

Application April 9, 1941, Serial No. 387,734

1 Claim. (Cl. 285—22)

This invention relates to a new oil well tubing hanger and casing head construction.

The main object of the invention is to provide means for introducing a plastic sealing or bonding material around the composition ring which is placed between the bonnet or upper head and the lower head or part of the pipe casing, to seal the joint and prevent the escape of any gas through the joint.

Another object is to provide the seats for the composition ring with flexible gaskets or rings each made of an oil resisting rubber and having inserts of neoprene, the flexible gaskets thus allowing for greater tolerance in machining of the joints when the flanges are pulled together.

Other objects and advantages will be noted from the following detailed description and the accompanying drawings in which:

Fig. 1 is a sectional view of a casing head and tubing hanger;

Fig. 2 is a section of the composition ring which is placed between the bonnet and the tubing hanger.

Fig. 3 is a top plane partly in section of the composition ring.

In the drawings in which like numerals indicate similar parts, 6 indicates the bonnet or upper head of the casing head and 7 indicates the lower part of the casing head. The bonnet and lower casing head are provided with the usual co-operating flanges 8 and 9 and are held together by bolts 10 passing through holes in the flanges. Spaced between the flanges is the usual metal or composition sealing ring 11 fitting in opposing grooves in the flanges.

The bonnet or upper head is cut away as at 12 to form a seat for a metal washer 13 and a channel shaped preformed flexible gasket 14 provided on its inner surface indicated at 15 with an oil resisting rubber, preferably formed of such a well known material as neoprene or the like. The tubing hanger is cut away to form a seat 16 oppositely opposed to the seat 12 of the upper head when the tubing hanger is in place. The seat 16 has therein a metal washer 16a and a flexible gasket 17 identical to the gasket 14. These rubber gaskets provide for tolerance in the machining of the flanges and seats and the gaskets are made of neoprene to resist deterioration due to contact with oil which will be explained later.

Within the seats 12 and 16 is placed a metal or composition ring 18 seating within the rubber gaskets. The ring is not solid throughout but has a plurality of openings 19 therein for a purpose to later be explained.

The bonnet member has at one side a passage 20 therethrough terminating adjacent the ring 18 and the space between the flanges 8 and 9. The passage 20 is part way screw threaded and is provided with a ball check valve 21 and a plug 22, the valve 21 having a socket 23 for the reception of an end wrench whereby it may be removed and the plug also having a socket 24 for a similar purpose.

Extending through the wall of the lower part of the casing is a set screw 25 of usual and known construction, the end of which fits into a recess 26 formed in the tubing hanger to hold the tubing hanger tightly in the casing against a metal to metal seat as at 27.

In the operation of the device, that is the sealing of the joint between the bonnet or upper head and the lower tubing head or casing, with the ring 18 in place and the flanges drawn tightly together as by the bolts 10, a pressure gun containing a plastic sealing or bonding agent such for example as ground asbestos and castor oil, is forced past the check valve 21 and through the passage and passes completely around the ring 18, the passages 19 in the ring permitting the bonding agent to pass through the same and the plastic thus fills all of the open space around the ring 18 and out to the washer 11. As will be seen the plastic which is partly castor oil contacts the rubber gaskets 14 and 17 and therefore it is preferable for the gaskets to be made of an oil resisting rubber such as neoprene to prevent the eating away of the gaskets by the oil. After the spaces are filled the check valve ball is seated due to the pressure of the sealing compound and the joint is now completely sealed, and would prevent the well pressure from passing the same.

It will readily be seen that the well pressure will at times effect a seal by the said pressure expanding the lips of the flexible gasket 14 or 17. That is, the differential pressure between the casing and the tubing would cause an effective seal on either of the gaskets, depending on which pressure is greatest. Thus if the tubing pressure should be higher than the casing pressure, then the lower gasket 17 would expand and seal, while if the casing pressure is higher than the upper gasket 14 would expand and seal. Under these conditions—plaster sealing agent would be injected as an added safety sealing measure.

In the event that it is desired to repack the joint, which becomes necessary every so often, the set screw 25 is screwed into the recess 26 whereby the tubing or casing could be hung in a well under pressure and the metal to metal seat indicated at 27 would almost completely seal off any pressure coming that way and the tubing or casing as hung could be blinded off with any ordinary and well known tubing or casing valve. Thus will be readily seen the advantage of being able to take off, if necessary, the bonnet or upper head 6, then renew the packing gaskets 14 and 17, and replace the plastic packing through the check valve.

Thus it will be seen that I have provided a very efficient and effective means of packing off the joint between the bonnet and lower head, and one which can be very easily and readily replaced when necessary or desired.

I claim:

A well head casing construction comprising upper and lower casing members with opposed flanges, a tubing hanger fitting within the casing head and supported in the lower head member, an outer packing ring spaced between the flanges of the casing members, a seat in the upper head, and a seat in the hanger cooperating therewith, a flexible gasket within each seat, an inner packing ring fitting between the upper seat of the casing head and the lower cooperating seat in the tubing hanger, and a valve controlled passage through the upper casing head and terminating inside of the packing ring between the flanges and adjacent the inner packing ring whereby a plastic sealing compound may be forced through the passage and fill the space between the packing ring and its seats and also fill that part of the space between the flanges extending inwardly from the packing ring and lying between the upper and lower casing flanges.

ERNEST L. BARKER.